United States Patent
Barkan et al.

(10) Patent No.: US 7,077,326 B2
(45) Date of Patent: Jul. 18, 2006

(54) GENERATING A SCAN PATTERN OVER MULTIPLE SURFACES OF SYMBOL-BEARING OBJECTS PASSING THROUGH FLAT BED READER

(75) Inventors: Edward Barkan, Miller Place, NY (US); Howard Shepard, Great River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 49 days.

(21) Appl. No.: 10/677,523

(22) Filed: Oct. 2, 2003

(65) Prior Publication Data

US 2005/0072848 A1 Apr. 7, 2005

(51) Int. Cl.
*G02B 26/00* (2006.01)
*G06K 7/10* (2006.01)
(52) U.S. Cl. .............................. 235/462.38; 235/462.33
(58) Field of Classification Search .............................
235/462.01–462.49, 454
See application file for complete search history.

(56) References Cited

U.S. PATENT DOCUMENTS

| | | | | |
|---|---|---|---|---|
| 3,928,759 A * | 12/1975 | Sansone | ..................... | 250/568 |
| 5,216,232 A * | 6/1993 | Knowles et al. | ......... | 235/462.4 |
| 6,045,046 A * | 4/2000 | Detwiler | ..................... | 235/114 |
| 6,076,735 A * | 6/2000 | Saegusa | ................... | 235/462.4 |
| 6,543,694 B1 * | 4/2003 | Detwiler | .................. | 235/462.4 |
| 6,971,579 B1 * | 12/2005 | Barkan et al. | ......... | 235/462.38 |

FOREIGN PATENT DOCUMENTS

EP 0 295 936 A3 12/1988

* cited by examiner

*Primary Examiner*—Michael G. Lee
*Assistant Examiner*—Jamara A. Franklin
(74) *Attorney, Agent, or Firm*—Kirschstein, et al.

(57) ABSTRACT

Scan lines are projected through a single horizontal window of a slot scanner and onto multiple surfaces of a product bearing a bar code symbol to be electro-optically read. The symbol may be in any orientation and on any vertical surface of the product, as well as on the bottom surface of the product.

6 Claims, 3 Drawing Sheets

GENERATING A SCAN PATTERN OVER MULTIPLE SURFACES OF SYMBOL-BEARING OBJECTS PASSING THROUGH FLAT BED READER

BACKGROUND OF THE INVENTION

1. Field of the Invention

The present invention generally relates to a flat bed reader for electro-optically reading indicia associated with objects passing through the reader and, more particularly, to generating a scan pattern over multiple surfaces of each object to insure reliable reading of the associated indicia.

2. Description of the Related Art

Flat bed laser readers, also known as horizontal slot scanners, have been used to electro-optically read bar code symbols, particularly of the Universal Product Code (UPC) type, at a point-of-transaction workstation in supermarkets, warehouse clubs, department stores, and other kinds of retailers for many years. As exemplified by U.S. Pat. No. 5,059,779; No. 5,124,539 and No. 5,200,599, a single, horizontal window is set flush with, and built into, a horizontal countertop of the workstation. Products to be purchased bear an identifying symbol and are slid across the horizontal window through which a multitude of scan lines is projected in a generally upwards direction.

The symbol itself may be oriented relative to the window in any orientation, for example, a so-called "picket fence" orientation in which the elongated parallel bars of the symbol are vertical, or a so-called "ladder" orientation in which the bars are horizontal, or an inclined orientation in which the bars are inclined at an angle relative to the vertical and the horizontal. The symbol may also be located anywhere on the product, for example, on a bottom surface facing the window, or on any upright surface generally perpendicular to the window, or on a top surface generally parallel to the window. In order for the symbol to be read, at least one of the scan lines must cross over the symbol in a direction generally perpendicular to the bars of the symbol regardless of the orientation of the symbol relative to the window or the location of the symbol relative to the product.

Typically, a rotary mirrored component is rotated underneath the window of the horizontal slot scanner and scans an incident laser beam across a plurality of stationary mirrors for reflection therefrom through the window as a scan pattern of scan lines designed to sweep a symbol on the bottom surface of the product, or on a leading surface (i.e., the surface facing in the forward direction of advancement of the product through the slot scanner) of the product. An operator is trained to position the symbol on the bottom or leading surfaces of the product during use.

The art has also proposed the addition of a vertical window at the workstation in order to project still more scan lines at the product at additional upright surfaces thereof. These dual-window readers provide high performance and enable many products to be processed rapidly, because they eliminate, to a large extent, the requirement to visually locate the symbol on each product, and to turn each product so that the symbol faces the single window of the horizontal slot scanner. All the operator must do is hold the product such that his on her hand is not covering the symbol.

As advantageous as the dual-window readers are, their large size and high cost make them unsuitable for applications where there is insufficient room available to accommodate the extra window, and where the high cost is unjustified. Nevertheless, even small workstations can benefit from a more productive reader which reduces the time that customers must wait for transactions to be processed, and which reduces the number of operators to be hired to provide acceptable checkout service.

SUMMARY OF THE INVENTION

OBJECTS OF THE INVENTION

One object of this invention is to project scan lines on multiple surfaces of a product passing through a horizontal slot scanner having a single horizontal window.

Another object of this invention is to project scan lines on both leading and trailing surfaces of a product passing through a horizontal slot scanner having a single horizontal window.

Still another object of this invention is to provide a single window slot scanner having productivity equivalent to dual-window slot scanners.

Yet another object of this invention is to provide a compact, inexpensive horizontal slot scanner of high performance and efficiency.

FEATURES OF THE INVENTION

In keeping with these objects and others which will become apparent hereinafter, one feature of this invention resides, briefly stated, in an arrangement for, and a method of, scanning indicia, such as one-dimensional bar code symbols, associated with products or objects passing in an advancement direction across a single horizontal window of a point-of-transaction workstation, e.g., a horizontal slot scanner, at which the indicia are to be electro-optically read.

In accordance with the invention, a rotary mirrored component is rotatable about an axis, and a plurality of stationary, folding mirrors is arranged about the axis. A light source, preferably a laser, generates and directs a light beam to the rotary component for reflection therefrom to the stationary mirrors for reflection therefrom through the window to multiple surfaces of each object. A drive, for example, a motor, rotates the rotary component to sweep the light beam across the stationary mirrors and form a scan pattern of scan lines at and past the window and onto the multiple surfaces of each object. At least one of the stationary mirrors is located behind the rotary component, as considered downstream of the advancement direction, for reflecting at least one of the scan lines at a trailing surface of each object. Hence, this invention provides increased productivity by having the capability to read indicia even if the indicia are located on the trailing surface of the object.

Preferably, the stationary mirrors are arranged to sweep scan lines over each upright surface of the object, as well as over the bottom surface of the object. The scan lines are sloped and positioned to read symbols in the picket fence orientation, or the ladder orientation, or any orientation inclined therebetween. Symbols of any orientation can thus be read at every side of the object, except the top surface. The operator can easily be trained to grip the object near its top as the object is advanced through the workstation, thereby exposing all the other surfaces to the scan lines projected through the single window, and increases productivity in much the same way as the larger, more expensive dual-window readers.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
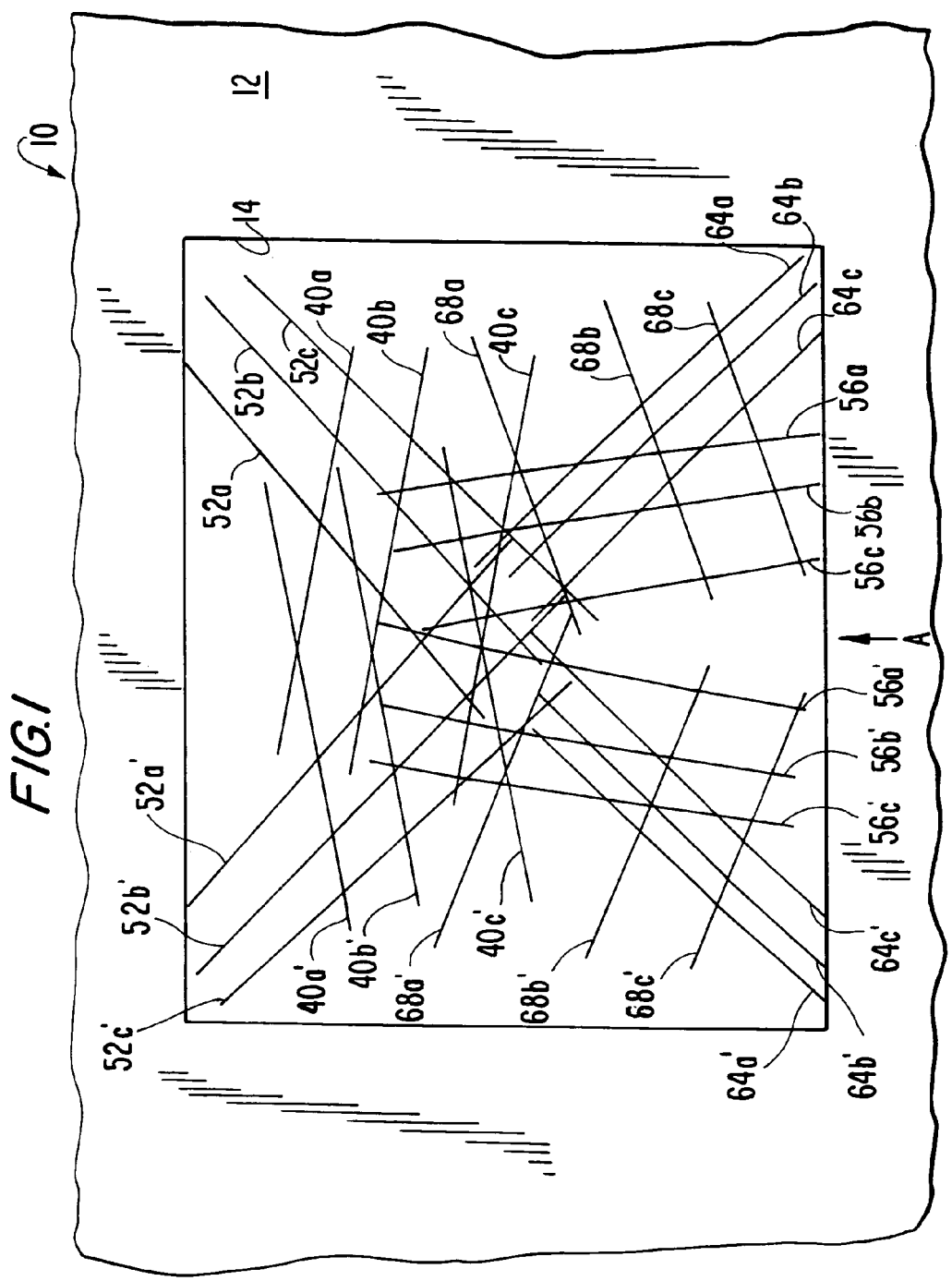
FIG. 1 is a top plan overhead view looking down onto a window of a horizontal slot scanner, and depicts a multitude of scan lines generated in accordance with this invention.

Reference numeral 10 generally identifies a workstation, as seen from overhead, for processing transactions and specifically a checkout counter at a retail site at which products, for example, a box 38 containing a foodstuff, are processed for purchase. Each product bears a bar code symbol. The counter includes a countertop 12 across which the products 38 are slid in an advancement direction, as indicated by the arrow A, over and past a horizontal window 14 set flush with, and built into, the countertop 12 of a horizontal slot scanner. A checkout clerk or operator is located at one side of the countertop, for advancing the products 38.

As described in detail below, a scan pattern generator underneath the window within the counter generates a scan pattern at the window 14, and projects the scan pattern into space upwardly away from the window. The scan pattern is comprised of multiple scan lines as shown in FIG. 1. At least one of the scan lines is intended to sweep over at least part of a symbol associated with, and typically printed on packaging for, the product 38 to be purchased. Once the symbol has been swept, light scattered off the symbol is detected, digitized and decoded in a manner well known in this art in order to identify the product. Once identified, a look-up table in a database can be accessed to retrieve information, such as a price for the product, and this retrieved information can then be processed in known manner to complete a purchase transaction at the workstation.

Figure 2:
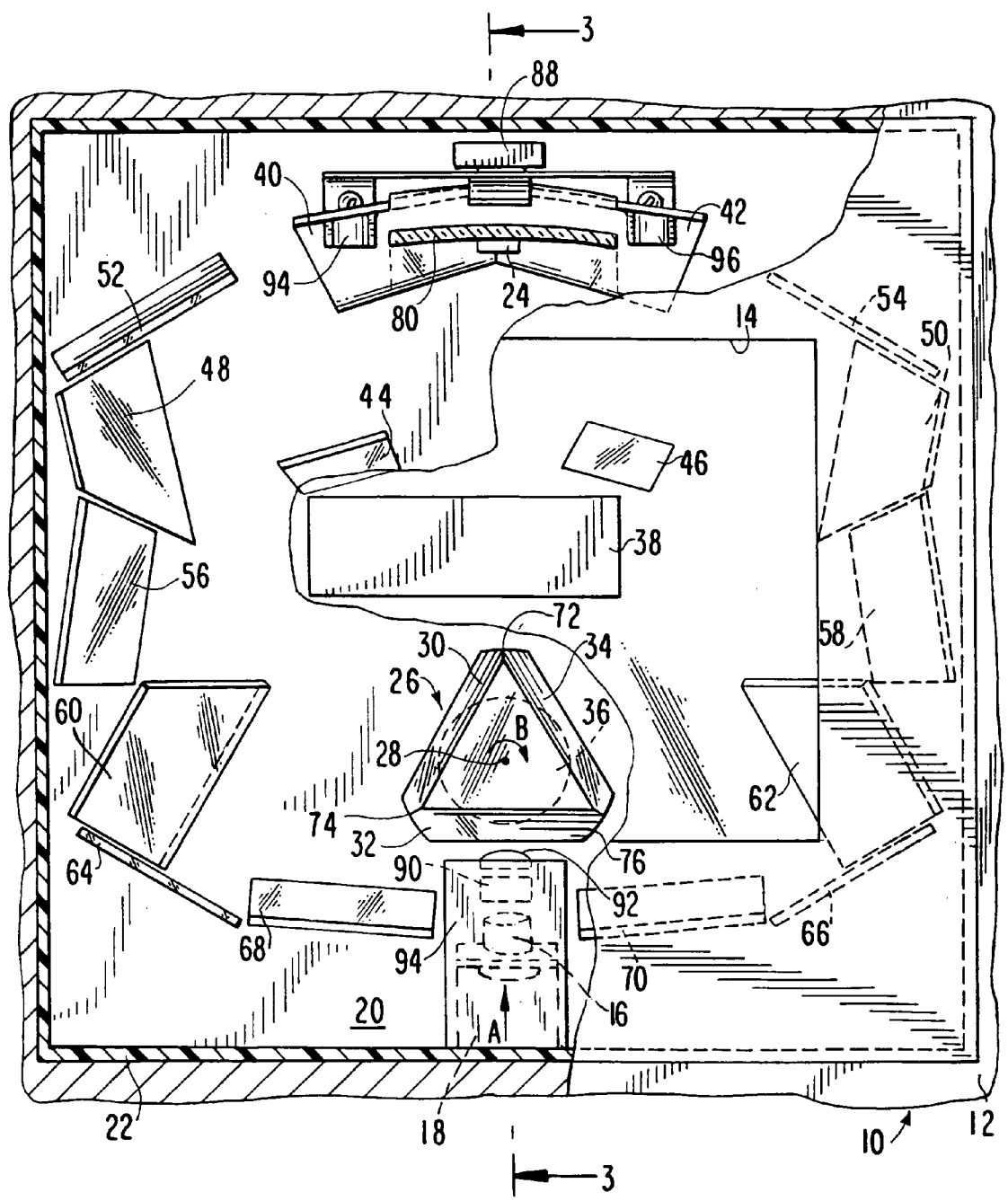
FIG. 2 is a broken-away, overhead view of an arrangement for generating the scan pattern of FIG. 1.
Figure 3:
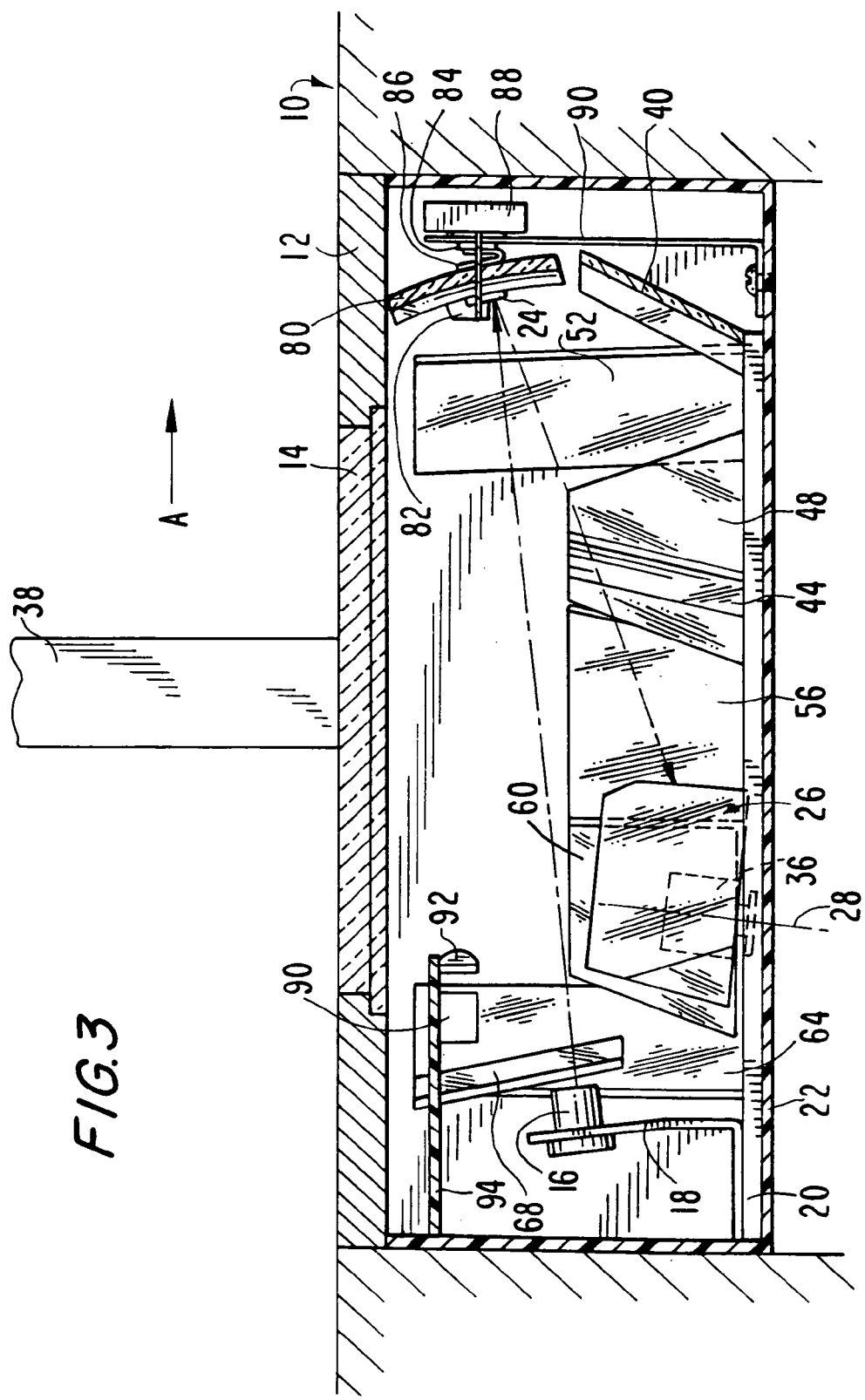
FIG. 3 is a sectional view taken on line 3—3 of FIG. 2.

Referring to FIGS. 2 and 3, a light source, such as laser 16, is mounted on a bracket 18 attached to a frame 20 mounted within a housing 22 installed underneath the countertop 12 of the workstation 10. The laser 16 emits a laser beam to an oscillatable, planar, scan mirror 24 for reflection therefrom to a rotary mirrored component 26 mounted on the frame 20 for rotation about an axis 28 in the direction of arrow B. The component 26 has rotary main mirrors 30, 32, 34 at its periphery. The component 26 is preferably a molded frusto-pyramidal block having three outer planar walls on which three planar mirrors are mounted, or on which a specular coating of light-reflecting material is applied to serve as the planar mirrors. Each main mirror 30, 32, 34 is tilted at a different angle of inclination, for example, 10°, 11.5° and 13°, relative to the axis 28. A drive, preferably an electric motor 36, is mounted on the frame 20 inside a hollow interior of the component 26 to rotate the component 26.

As best seen in FIG. 2, a plurality of stationary, light-folding, planar mirrors is mounted on the frame 20 generally around the axis 28 in an annulus. The stationary mirrors are symmetrical relative to a central line that divides the countertop into right and left halves, as considered along the advancement direction A. The stationary mirrors include a first set of mirrors 40, 42; a second set of mirrors 44, 68 and 46, 70; a third set of mirrors 48, 52 and 50, 54; a fourth set of mirrors 56, 58; and a fifth set of mirrors 60, 64 and 62, 66. Light reflected off the main mirrors 30, 32, 34 is directed to the sets of stationary mirrors for reflection therefrom toward and through the window 14 across which the product 38 is advanced.

More specifically, during rotation of the component 26, a portion of main mirror 30 adjacent its leading edge 72 reflects the incident light beam from the scan mirror 24 successively onto mirror 60 for reflection therefrom to mirror 64 to generate scan line 64a, onto mirror 56 to generate scan line 56a, onto mirror 48 for reflection therefrom to mirror 52 to generate scan line 52a, onto mirror 44 for reflection therefrom to mirror 68 to generate scan line 68a, and onto mirror 40 to generate scan line 40a, until its trailing edge 74 clears the incident light beam.

Next, a portion of main mirror 32 adjacent edge 74 reflects the incident light beam onto the stationary mirrors, as described above, until its trailing edge 76 clears the incident light beam, thereby generating five more scan lines 64b, 56b, 52b, 68b and 40b. Thereupon, in an analogous manner, the main mirror 34 generates five more scan lines 64c, 56c, 52c, 68c and 40c. The groups of scan lines with the suffixes "a", "b" and "c" are spaced apart because, as noted above, the main mirrors 30, 32 and 34 lie at different angles of inclination relative to axis 28.

As described so far, there are five sets of three scan lines each generated at the right side of window 14 in FIG. 1 due to reflections off the stationary mirrors at the left side of the arrangement. In analogous manner, the stationary mirrors at the right side of the arrangement produce five additional mirror-symmetrical sets of three scan lines each at the left side of the window 14. These additional sets have been identified in FIG. 1 by the same reference numerals as the first-mentioned sets, but with the addition of a prime. Thus, the scan pattern at the plane of the window 14 includes ten intersecting sets of scan lines, each set having three generally parallel scan lines.

The scan lines 64a, b, c are projected upwardly from the lower right corner of the window, are angled toward the center of the window, and will project scan lines that are essentially vertical on the upright surface of the product 38 that faces the lower right corner of the window as the product is advanced across the window along the advancement direction A. Hence, scan lines 64a, b, c will read a symbol in ladder orientation that faces directly downstream of the advancement direction, or that faces the right side of the window, or anywhere in between.

In analogous manner, the scan lines 64a', b', c' are projected upwardly from the lower left corner of the window in a mirror image relationship to scan lines 64a, b, c and will read ladder-oriented symbols facing directly downstream, or facing to the left side of the window, or anywhere in between. The scan lines 64a, b, c, a', b', c' will therefore read ladder-oriented symbol over 180° on the trailing surface of the product, which is a surface that was not heretofore readable by a single window horizontal slot scanner.

Scan lines 52a, b, c and their mirror image scan lines 52a', b', c' perform in much the same manner as the scan lines 64a, b, c, a', b', c', except that they project nearly vertical scan lines on the leading surface of the product and will therefore read ladder-oriented symbols over 180° on the leading surface of the product. Thus, the scan lines 64a, b, c, a', b', c' and 52a, b, c, a', b', c' enable ladder-oriented symbols to be read on all upright surfaces 360° around the product as the product is moved across the window.

Scan lines 68*a, b, c* are oriented to produce essentially horizontal lines on the trailing surface of the product from the bottom to the top at the right side of the product so as to read picket fence-oriented symbols that face downstream of the advancement direction, or that face about 60° to the right, or at any angle in between. Scan lines 68*a', b', c'* can read picket fence-oriented symbols that face directly downstream, or that face about 60° to the left, or at any angle in between. Together, the scan lines 68*a, b, c, a', b', c'* can read picket fence-oriented symbols over around 120° of the trailing surface of the product moving across the window.

Scan lines 40*a, b, c, a', b', c'* are oriented to produce nearly horizontal lines on the leading surface of the product from its bottom to its top at the right and left sides of the product so as to read picket fence-oriented symbols over around 120° of the leading surface of the product moving across the window.

Scan lines 56*a, b, c* are projected upwards and toward the center of the window so that they sweep essentially horizontal lines on the right side, thereby enabling picket fence-oriented symbols on the right side to be read. Scan lines 56*a, b, c* fill in the gap between the 120° on the leading surface of the product swept by scan lines 40*a, b, c* and the 120° on the trailing surface of the product swept by scan lines 68*a, b, c*. The scan lines 56*a', b', c'* enable picket fence-oriented symbols on the left side to be read.

Scan lines 56*a, b, c, a', b', c'* have the further capability of sweeping ladder-oriented symbols on the bottom surface of the product, while scan lines 40*a, b, c, a', b', c'* and 68*a, b, c, a', b', c'* sweep picket fence-oriented symbols on the bottom surface of the product.

In summary, the scan lines produced herein enable both picket fence and ladder oriented symbols on any vertical surface of the product, as well as the bottom surface of the product, to be read. Symbols inclined at orientations between these two orientations can also be read.

Movement of the scan lines can be achieved by oscillating the scan mirror 24. As shown in FIG. 3, the scan mirror 24 is mounted on a light collection mirror 80 which is, in turn, mounted on a mirror bracket 82. At least one permanent magnet 84 is mounted on one leg of a U-shaped support 86 whose other leg is connected to the mirror bracket 82.

An electromagnetic coil 88 is mounted on a coil bracket 90 which, in turn, is mounted on the housing 22. A pair of planar leaf springs 94, 96 preferably constituted of Mylar™ material about 10 mils thick, is mounted between the coil bracket 90 and the mirror bracket 82 at opposite sides of the scan mirror 24.

Upon application of a periodic, alternating drive signal to the electromagnetic coil 88, an alternating magnetic field is generated which interacts with the permanent magnetic field of the magnet 84, thereby attracting and/or repelling the magnet 84, together with the support 86, the mirror bracket 82, and the mirrors 24, 80, all of which flex the leaf springs 94, 96 at their centers to one end position. Thereupon, the springs restore these components back to their initial positions with or without the aid of the interacting magnetic fields. A typical oscillation for these components is on the order of 1° at a frequency of about 40 Hz.

The oscillation of the scan mirror 24 causes still more scan lines to be generated in the scan pattern of FIG. 1, thereby further improving reader performance. The oscillating collection mirror 80 collects light scattered off the symbol and directs the scattered light to a photodetector 90 via a collection lens 92 for generating an analog electrical signal indicative of the symbol. The electrical signal is then digitized and decoded in known manner to identify the product relating to the symbol. The photodetector 90 and lens 92 are mounted on a support board 94 connected to the housing 22.

Almost all decoders in current use can decode a symbol even if no individual scan line crosses the entire symbol, because many symbologies, i.e., UPC, EAN and JAN, are designed to be decoded in halves. In other words, one scan line can cover only half the symbol, and another scan line, anywhere in the scan pattern, can cover the other half. The decoder then assembles the two halves and, in some cases, some decoders are capable of assembling even smaller fractions of the symbol. This is especially desirable when truncated symbols, or damaged or wrinkled symbols, are to be read where it may not be possible to scan the entire symbol with a single scan line.

It will be understood that each of the elements described above, or two or more together, also may find a useful application in other types of constructions differing from the types described above.

While the invention has been illustrated and described as embodied in a reader for electro-optically reading indicia through a horizontal window at which a scan pattern is produced, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for scanning indicia associated with objects passing in an advancement direction across a single horizontal window of a point-of-transaction workstation at which the indicia are to be electro-optically read, the arrangement comprising:
    a) a rotary mirrored component rotatable about an axis, the rotary component having a plurality of planar tilted mirrors tilted at different angles of inclination relative to the axis;
    b) a plurality of stationary, folding mirrors arranged generally about the axis;
    c) a light source for generating a light beam;
    d) an oscillator for oscillating the light beam, and for directing the oscillating light beam to the rotary component for reflection from the tilted mirrors to the stationary mirrors for reflection therefrom through the window to multiple surfaces of each object;
    e) a drive for rotating the rotary component to sweep the oscillating light beam across the stationary mirrors and form a scan pattern of scan lines at and past the window and onto the multiple surfaces of each object; and
    f) at least one of the stationary mirrors being located behind the rotary component, as considered downstream of the advancement direction, for reflecting at least one of the scan lines at a trailing surface of each object.

2. The arrangement of claim 1, wherein the axis of the rotary component is not perpendicular to the window.

3. The arrangement of claim 1, wherein the indicia are bar code symbols orientable on the objects between mutually orthogonal orientations, and wherein said at least one stationary mirror reflects said at least one scan line to sweep a symbol oriented in one of said orientations; and wherein at least another of the stationary mirrors is located behind the rotary component, as considered downstream of the advancement direction, for reflecting another of the scan lines at the trailing surface of each object to sweep a symbol oriented in the other of said orientations.

4. The arrangement of claim 1, wherein the oscillator includes an oscillating mirror, and an electromagnetic drive for oscillating the oscillating mirror.

5. The arrangement of claim 4, wherein the oscillator oscillates the oscillating mirror over an arcuate distance on the order of 1° and at a frequency on the order of 40 Hz.

6. A method of scanning indicia associated with objects passing in an advancement direction across a single horizontal window of a point-of-transaction workstation at which the indicia are to be electro-optically read, the method comprising the steps of:

a) mounting a rotary mirrored component for rotation about an axis, the rotary component having a plurality of planar tilted mirrors tilted at different angles of inclination relative to the axis;

b) arranging a plurality of stationary, folding mirrors generally about the axis;

c) generating a light beam;

d) oscillating the light beam and directing the oscillating light beam to the rotary component for reflection from the tilted mirrors to the stationary mirrors for reflection therefrom through the window to multiple surfaces of each object;

e) rotating the rotary component to sweep the oscillating light beam across the stationary mirrors and form a scan pattern of scan lines at and past the window and onto the multiple surfaces of each object; and f) locating at least one of the stationary mirrors behind the rotary component, as considered downstream of the advancement direction, for reflecting at least one of the scan lines at a trailing surface of each object.

* * * * *